United States Patent [19]
Verpooten

[11] Patent Number: 6,055,226
[45] Date of Patent: Apr. 25, 2000

[54] METHOD TO SIGNAL A FAILURE IN A MIXED PDH/SDH NETWORK IN ORDER TO ENABLE THE LATTER TO PROVIDE A SERVICE SUCH AS A PROTECTION MECHANISM

[75] Inventor: Luc Marie Marcel Verpooten, Schilde, Belgium

[73] Assignee: Alcatel, Paris, France

[21] Appl. No.: 08/908,585

[22] Filed: Aug. 8, 1997

[30] Foreign Application Priority Data

Aug. 9, 1996 [EP] European Pat. Off. .............. 96202252

[51] Int. Cl.[7] ....................................... H04J 3/12
[52] U.S. Cl. ........................... 370/222; 370/227; 370/242
[58] Field of Search .................................. 370/222, 223, 370/226, 227, 228, 242, 243, 246, 248, 249, 907, 522, 410

[56] References Cited

U.S. PATENT DOCUMENTS

| | | | |
|---|---|---|---|
| 4,961,180 | 10/1990 | Schwarz et al. | 370/227 |
| 5,193,086 | 3/1993 | Satomi et al. | 370/228 |
| 5,233,600 | 8/1993 | Pekarske | 370/228 |
| 5,265,096 | 11/1993 | Parruck . | |
| 5,367,395 | 11/1994 | Yajima et al. | 370/242 |
| 5,491,686 | 2/1996 | Sato | 370/223 |
| 5,712,845 | 1/1998 | Peltomaki | 370/226 |
| 5,757,774 | 5/1998 | Oka | 370/242 |
| 5,799,001 | 8/1998 | Lee et al. | 370/223 |

OTHER PUBLICATIONS

ITU–T Recommendation G.796, Characteristics of a 64 kbit/s Cross Connect Equipment with 2048 kbit/s Access Ports (Sep. 1992), pp 6–7.

ITU–T Recommendation G.783 (Jan. 1994), Characteristics of Synchronous Digital Hierarchy (SDH) Equipment Functions Blocks, p. 47.

ITU–T Recommendation G.841 (Jul. 1995), "Types and Characteristics of SDH Network Protection Architectures", pp. 1–6.

"1654 SL and 1664 SL 622 Mbit/s and 2.488 Gbit/s Synchronous Transmission Systems", F. Cadorel et al, *Commutation & Transmission* vol. 14 (1992), No. 1, Paris, pp. 77–86.

"Transmission Testing: More Capability Without Added Complexity", A. Rougier, *Telecommunications,* vol. 3, Aug. 1995, pp. 25–28.

*Primary Examiner*—Chau Nguyen
*Assistant Examiner*—Phuongchau Ba Nguyen

[57] ABSTRACT

To signal a failure in a mixed PDH/SDH network in order to enable this network to provide a service such as a protection mechanism, an alarm indication has to be provided to an SDH node in the event of that failure. A PDH node linked to that SDH node creates an alarm data stream and provides this alarm data stream to the SDH node in the event of any of:

an internal PDH node failure; and a link failure between the previous node and the PDH node; and upon reception of such an upstream created alarm data stream;

The SDH node creates the alarm indication in the event of any of:

a link failure between the PDH node and the SDH node; and upon reception of such an alarm data stream coming from the PDH node.

1 Claim, 3 Drawing Sheets

METHOD TO SIGNAL A FAILURE IN A MIXED PDH/SDH NETWORK IN ORDER TO ENABLE THE LATTER TO PROVIDE A SERVICE SUCH AS A PROTECTION MECHANISM

BACKGROUND OF THE INVENTION

1. Technical Field of the Invention

The present invention relates to a method to signal a failure to an SDH node in a mixed PDH/SDH network, a mixed PDH/SDH network realizing said method, a PDH node and an SDH node for inclusion in such a mixed PDH/SDH network as

2. Discussion of Related Art

It should be realized that the Synchronous Digital Hierarchy (SDH) is a set of international, digital transmission standards. SDH is the international version of the Synchronous Optical Network (SONET), which is used in North America. The fundamental principles of SONET apply directly to SDH. In contrast to the existing Plesiochronous Digital Hierarchy (PDH), SDH allows direct access to tributary signals without demultiplexing the composite signal. As a result, network node costs are reduced because direct multiplexing is cheaper than step-by-step multiplexing furthermore, SDH supports advanced operations, administration, and maintenance (OA&M) by dedicating several embedded channels for this purpose. In the PDH it is not a simple task to measure network performance, respond to network failures, or manage remote network equipment from control centers.

Methods to signal a failure in an SDH network are already known in the art, e.g., from the International Telecommunication standardization sector of ITU-T Recommendation G.841 (07/95): Digital Networks: Types and characteristics of SDH network protection architectures and more particularly from page 1 to 7 thereof entitled Terms and conditions, which describe the working of protection mechanisms in an SDH network. Therein it is described how data is sent over an active path from an SDH bridge node to an SDH switching node via a plurality of SDH nodes. In the event of a failure somewhere on the active path the next SDH node of that active path creates an alarm indication and provides this to the following SDH node. Such a failure can be:

an internal SDH node failure; or a link failure between the previous SDH node and the SDH node which creates the alarm indication; or an upstream failure on the active path which is indicated to the SDH node with such an alarm indication.

In this way, the alarm indication is forwarded downstream to the following SDH switching node which switches over from the active path to a back-up path in order to receive the data over the latter path. The back-up path originals also at the SDH bridge node and goes via other SDH nodes to the SDH switching node.

The alarm indication is indicated in the SDH overhead of the SDH virtual containers, which are included in the SDH higher order data stream, by setting predefined alarm indication bits of this SDH overhead in the active state.

However in a mixed PDH/SDH network when the active path includes for instance PDH nodes the alarm indication is not forwarded towards the SDH switching node in the event of a failure somewhere on the active path before the PDH node.

Indeed as is described in, e.g., International Telecommunication standardization sector of ITU-T Recommendation G.783 (01/94): General aspects of digital transmission systems; terminal equipments: characteristics of synchronous digital hierarchy (SDH) equipment functional blocks, and more particularly on page 47 Table 4–12/G.783 thereof an SDH node upon the presence of an alarm indication substitutes the data to be sent to the next node with an alarm indication signal. This alarm indication signal is, e.g., an "All-ones" data stream and is equivalent to the alarm data stream mentioned in the claims below.

In a mixed PDH/SDH network, a PDH node following on the active path coater an SDH node, thus receives in the event of an upstream failure such an alarm indication signal.

A PDH node which receives a higher order data stream, demultiplexes this higher order data stream into lower order data segments, cross-connects these lower order data segments from the inputs to one or more outputs and multiplexes them again into higher order data streams which are provided to the next node. The working of such a PDH node is explained in International Telecommunication standardization sector of ITU-T Recommendation G.796 (09/92): General aspects of digital transmission systems; terminal equipments: Characteristics of a 64 kbit/s cross connect equipment with 2048 kbit/s access ports. More particularly on page 6 and 7 tables 1/G.796 and 2/G.796 it is described what actions a PDH cross-connect equipment, which is equivalent to the PDH node used herein, is expected to take upon reception of a higher order data stream which is an alarm data stream.

From the above it is clear that although upon reception of an upstream created alarm data stream by a PDH node, all the outgoing higher order data streams to which the derived lower order data segments were cross-connected carry a part of this alarm data stream, this can not be recognized by a following SDH node as a failure and the mixed PDH/SDH network is not able to provide a service such as a protection mechanism.

SUMMARY OF INVENTION

An object of the present invention is therefor to provide a method to signal a failure in a mixed PDH/SDH network in order to enable the mixed PDH/SDH network to provide a service such as a protection mechanism.

According to a first aspect of the invention, a method to signal a failure in a mixed PDH/SDH network in order to enable the mixed PDH/SDH network to provide a service, the mixed PDH/SDH network including an SDH node and at least one PDH node linked to the SDH node by at link, the method for providing an alarm indication to the SDH node of the failure, the method including the steps of:

a) creating an alarm data stream by the PDH node and providing the alarm data stream from the PDH node to the SDH node, in the event of any of an internal failure of the PDH node, recognition of a first loss of signal condition by the PDH node, and reception of an upstream created alarm data stream by the PDR node; and b) creating the alarm indication by the SDH node in the event of any of reception of the alarm data stream by the SDH node from the PDH node, and recognition of a second loss of signal condition by the SDH node which indicates a failure of the link between the PDH node and the SDH node.

According to a second aspect of the invention, a mixed PDH/SDH network for signaling a failure for providing a service, the mixed PDH/SDH network including an SDH node and at least one PDH node linked to the SDH node by a link, the mixed PDH/SDH network for providing an alarm indication to the SDH node of the failure and: a) the PDH node including means to create an alarm data stream and to provide the alarm data stream from the PDH node to the SDH node, in the event of any of an internal failure of the PDH node, recognition of a first loss of signal condition by the PDH node, and reception of an upstream created alarm data stream by the PDH node; and b) the SDH node including means to create the alarm indication in the event of any of reception of the alarm data stream by the SDH node from the PDH node, and recognition of a second loss of signal condition by the SDH node which indicates a failure of the link between the PDH node and the SDH node.

According to a third aspect of the invention, a PDH node for inclusion in a mixed PDH/SDH network wherein the PDH node is provided with means to signal a failure to an SDH node included in the mixed PDH/SDH network and linked to the PDH node in order to enable the mixed PDH/SDH network to provide a service and wherein the PDH node is provided with means to create an alarm data stream and to provide the alarm data stream from the PDH node to the SDH node, in the event of any of an internal failure of the PDH node, recognition of a first loss of signal condition by the PDH node, and reception of an upstream created alarm data stream by the PDH node.

According to a fourth aspect of the invention, an SDH node for inclusion in a mixed PDH/SDH network including at least one PDH node linked to the SDH node by a link, wherein in order to enable the mixed PDH/SDH network to provide a service, the SDH node is provided with means to create an alarm indication in the event of any of reception of an alarm data stream from the PDH node, and recognition of a second loss of signal condition which indicates a failure of the link between the PDH node and the SDH node.

Indeed, according to the invention, the PDH node creates at each involved output again an alarm data stream similar to such an SDH alarm indication signal and provides this to the following node.

These actions are also performed by the PDH node in the event of an internal PDH node failure or a link failure which is indicated by a first loss off signal condition.

When the following node is again a PDH node, the alarm data stream is received and recreated at each involved output and provided, e.g., to tire following node on the active path.

When the following node is an SDH node, the alarm data stream coming from a PDH node is, according to the invention, received and recognized by the SDH node which creates the alarm indication.

These actions are also performed by the SDH node in the event of a link failure between a PDH node and a following SDH node which is indicated by a second loss of signal condition.

Thus, in the event of a failure on the active path, the failure will be forwarded via a mix of PDH nodes and SDH nodes towards the SDH switching node and the mixed PDH/SDH network is able to provide the service of a protection mechanism.

BRIEF DESCRIPTION OF THE DRAWING

The above mentioned and other objects and features of the invention will become more apparent and the invention itself will be best understood by referring to the following description of an embodiment taken in conjunction with the accompanying drawings wherein.

DETAILED DESCRIPTION OF PREFERRED EMBODIMENT

Figure 1:
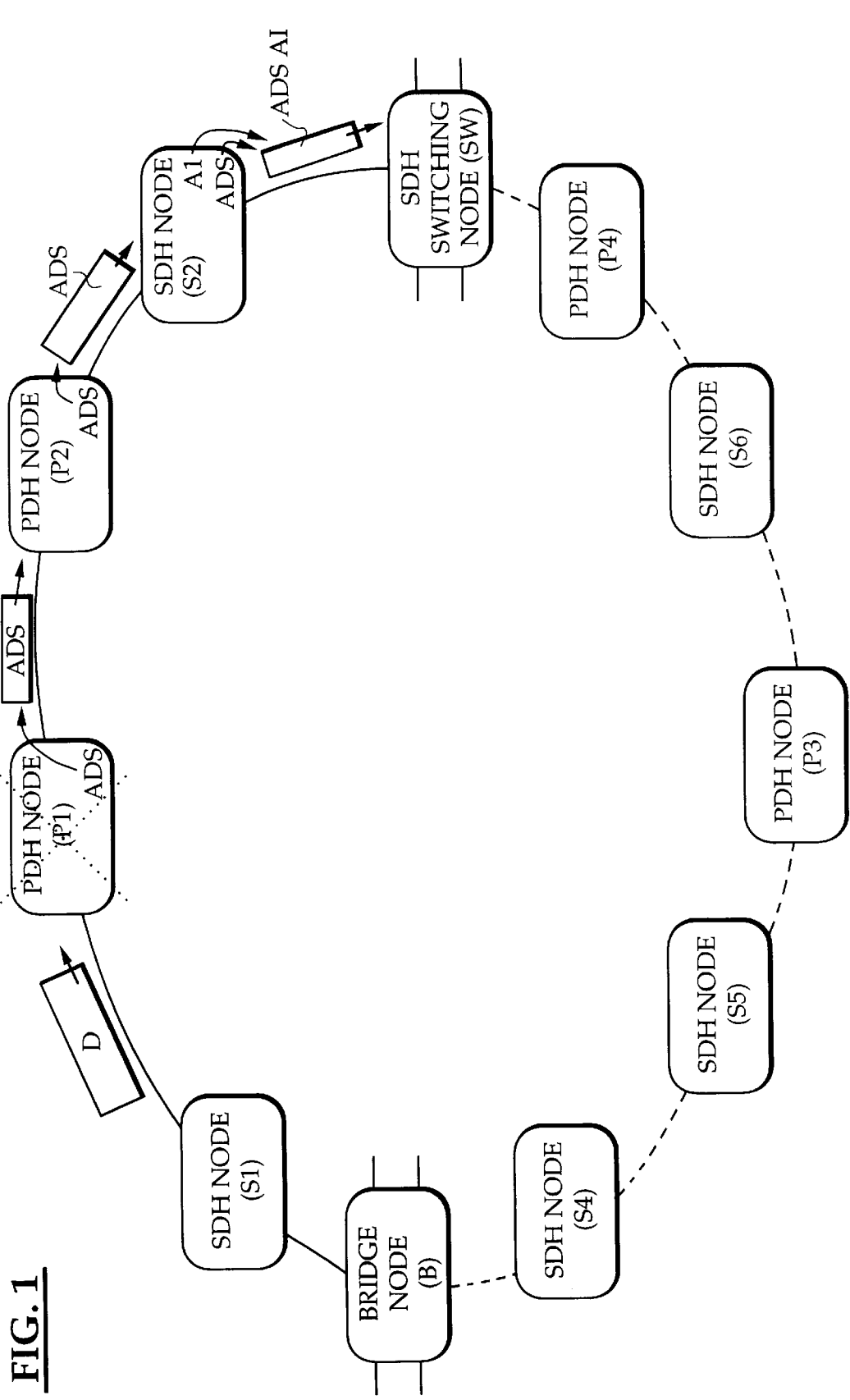
FIG. 1 represents a mixed PDH/SDH network which is able to provide a service such as a protection mechanism

Referring to FIG. 1, a mixed PDH/SDH network which is able to provide a service such as a protection mechanism will be described. First the global working of the protection mechanism will be explained. Based on this description the detailed actions regarding the invention of each node in the event of a particular failure will be described. Based on this description the implementation of the functional blocks in FIG. 1 will be obvious for a person skilled in the art.

The mixed PDH/SDH network includes the following nodes: a bridge node B; an SDH switching node SW; five SDH nodes S1, S2, S4, S5 and S6; and four PDH nodes P1, P2, P3 and P4.

The bridge node B is an SDH node which is able to transmit identical data on both an active path and a back-up path.

The switching node SW is an SDH node which is able to select data from the back-up path rather than from the active path.

A 1 to 1 protection mechanism is provided in the network which means that for each active path one back-up path exists.

The active path starts (full line) in the bridge node B and goes via the nodes S1, P1, P2 and S2 to the switching node SW. The back-up path (dashed line) starts in the bridge node and goes via the nodes S4, S5, P3, S6 and P4 to the switching node SW.

Each included node has different inputs and different outputs. In order not to overload the figure only for the bridge node B and the switching node SW different inputs and outputs are shown. For the other nodes, only the involved inputs and outputs which are linked to provide the active path and back-up path are shown.

Each PDH node is able to perform the following actions upon reception of a higher order data stream: demultiplexing this higher order data stream into low order data segments, associating an overhead segment to these low order data segments, cross-connecting data segments which each include a low order data segment and the associated overhead, deriving from the data segments again the low order data segments and multiplexing the low order data segments again into outgoing higher order data streams which are provided to the next node.

Figure 2:
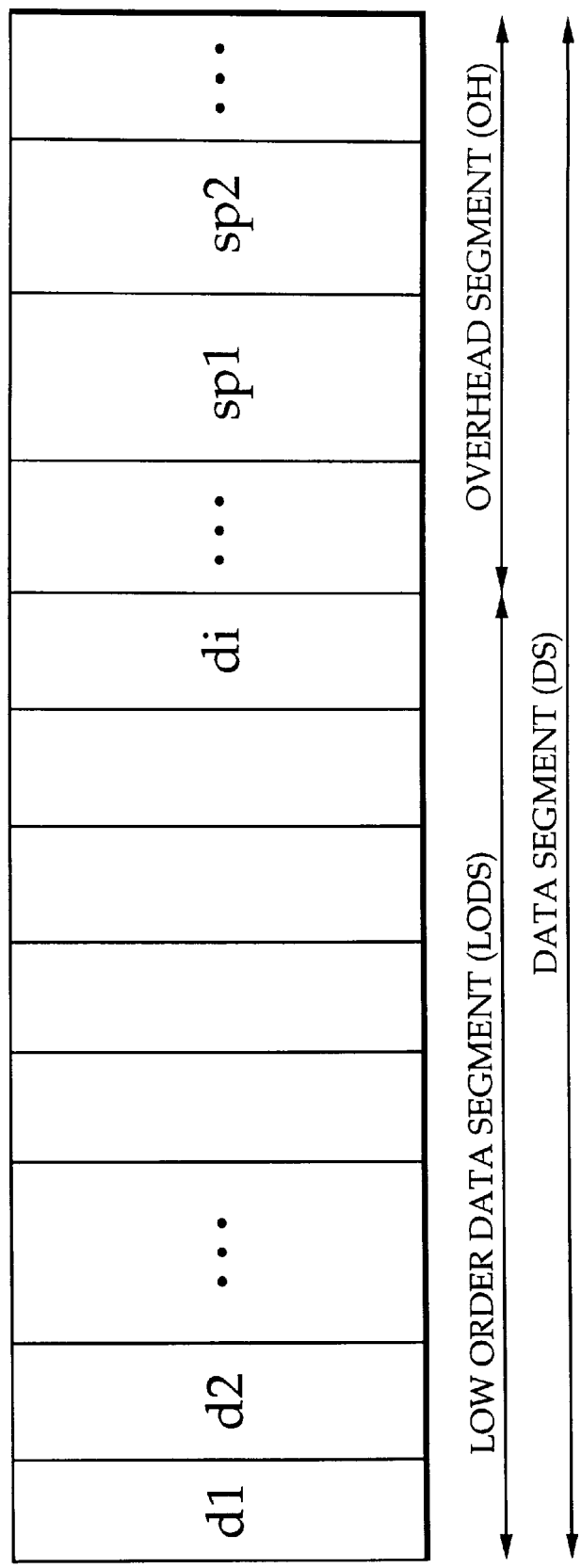
FIG. 2 is a representation of a data segment which is cross-connected from an input to an output of a PDH node.

A representation of a data segment DS which includes a low order data segment LODS and the associated overhead segment OH is shown in FIG. 2.

The low order data segment LODS includes the data bits d1, d2, . . . , di which are part of a higher order data stream.

The overhead segment OH includes two spare bits: sp1 bit to indicate an internal failure and a sp2 bit to indicate an external failure.

Between any SDH node and any PDH node or between two PDH nodes a higher order data stream is transported and between two SDH nodes an SDH higher order data stream is transported.

The SDH nodes perform the usual add/drop multiplexing tasks which are known to a person skilled in the art. To explain the working of the mixed PDH/SDH network only the actions of an SDH node included between a PDH node and a following SDH node, e.g., link P2 to S2 and S2 to SW are here described. Upon reception of a higher order data stream coming from the PDH node P2 the SDH node S2 performs the following actions: multiplexing the higher order data stream in the payload of an SDH virtual container, adding an SDH overhead to the payload and including the virtual container in an SDH higher order data stream which is provided to the following SDH node SW.

It is assumed that a data packet D has to be sent over the active path from the bridge node B to the switching node SW. In the event of a failure, an alarm indication A1 is signaled to the switching node SW which selects the data D from the back-up path instead of from the active path. How this is done, i.e. the detailed working of the 1 to 1 protection mechanism goes beyond the scope of the invention and is therefor not described in detail. The intention is to describe how, according to the invention, the alarm indication A1 is created and forwarded to the SDH switching node SW in the event of a failure anywhere on the active path, e.g., an internal failure of the PDH node P1.

It has to be noted here that in this embodiment all included PDH nodes and SDH nodes are adapted following the present invention.

A higher order data stream which includes a low order data segment i.e. data D is received by the node P1. The particular internal failure of P1 influences the data D which is indicated by activating spare bit sp1, included in the part of the associated overhead segment OH which is shown in FIG. 2.

Node P1 substitutes the outgoing higher order data which includes ones of the low order data segments, e.g., data D whereof a part of the associated overhead segment, i.e., bit sp1 is active, with the alarm data stream ADS. This alarm data stream is provided to the following node P2.

Node P2 receives a higher order data stream i.e. alarm data stream ADS which is for this node an upstream created alarm data stream. Upon reception of an upstream created alarm data stream the part of the overhead segment associated to the low order data segments which are derived from the upstream created alarm data stream are activated, i.e., spare bit sp2 which is shown in FIG. 2 is activated.

Node P2 substitutes the outgoing higher order data which has to be provided to the next node S2 on the active path and which includes one of the low order data segments derived from the upstream created alarm data stream and whereof a part of the associated overhead segment i.e. bit sp2 is active, with the alarm data stream ADS. This alarm data stream ADS is provided to the next node S2.

Node S2 receives the alarm data stream ADS coming from a PDH node P2 and creates the alarm indication A1. This alarm indication is provided together with the locally created alarm data stream ADS in an SDH virtual container to the next node which is the SDH switching node SW.

The SDH switching node SW receives an alarm indication which is for this node an indication to take the appropriate actions to switch over from the active path to the back-up path in order to receive the following data e.g. D' (not shown on the figure).

In this way the mixed PDH/SDH network is able to provide the service of a protection mechanism.

Although the above description was based on the occurrence of an internal failure in P1, it will be evident to any person skilled in the art based on the above teachings that a mixed PDH/SDH network is able to provide in the above described way the service of a protection mechanism in the event of any failure in the mixed PDH/SDH network.

It will similarly be evident to any person skilled in the art that also the SDH switching node SW and the bridge node B are creating an alarm indication in the event of receiving an alarm data stream from a PDH node or in the event of a link failure between a previous PDH node and this switching node SW.

Furthermore it is noticed that although in this embodiment all included nodes are adapted following the invention, a node or an SDH node which are adapted following the invention are still able to work together with non-adapted nodes in order to provide the basic functions of a communication network.

Still a remark is that although in this embodiment the use of spare bit sp1 and spare bit sp2 included in the part of the overhead segment of the PDH node is described, the present invention is not restricted to methods wherein these bits are used, but that any known combination of any available bits in the overhead segment can be used to define an activated state which indicates the presence of a failure and or that spare bit sp1 and spare bit sp2 are the same bit.

Note that the associated overhead segment OH only exists internally in the PDH node of this particular embodiment and that the invention is not restricted to PDH nodes which are working with such an overhead segment OH but that the presence of a failure can also be indicated by other methods like e.g. management data packets inserted in the datastream. However, since the method with an overhead segment OH is a very quick method to report the presence of a failure in a PDH node, this method was preferred to be used in the embodiment.

It has to be noticed that the term "to activate a bit" used in the above description means that the value of this bit changes of polarity, i.e., it changes either to a positive or to a negative value.

Furthermore, the alarm data stream ADS is like described above, e.g., an "All-ones" data stream but can also be another predefined data stream like, e.g., an "All-zero" data stream.

Finally it has to be remarked that although this particular embodiment of the invention is described as to be used in a one to one protection mechanism, it will be evident to a person skilled in the art that the method of the invention is not restricted to this use but that the method to signal a failure in a mixed PDH/SDH network can also be used for other protection mechanisms like hitless protection or other applications e.g. fault localization as required to support network management.

Figure 3:
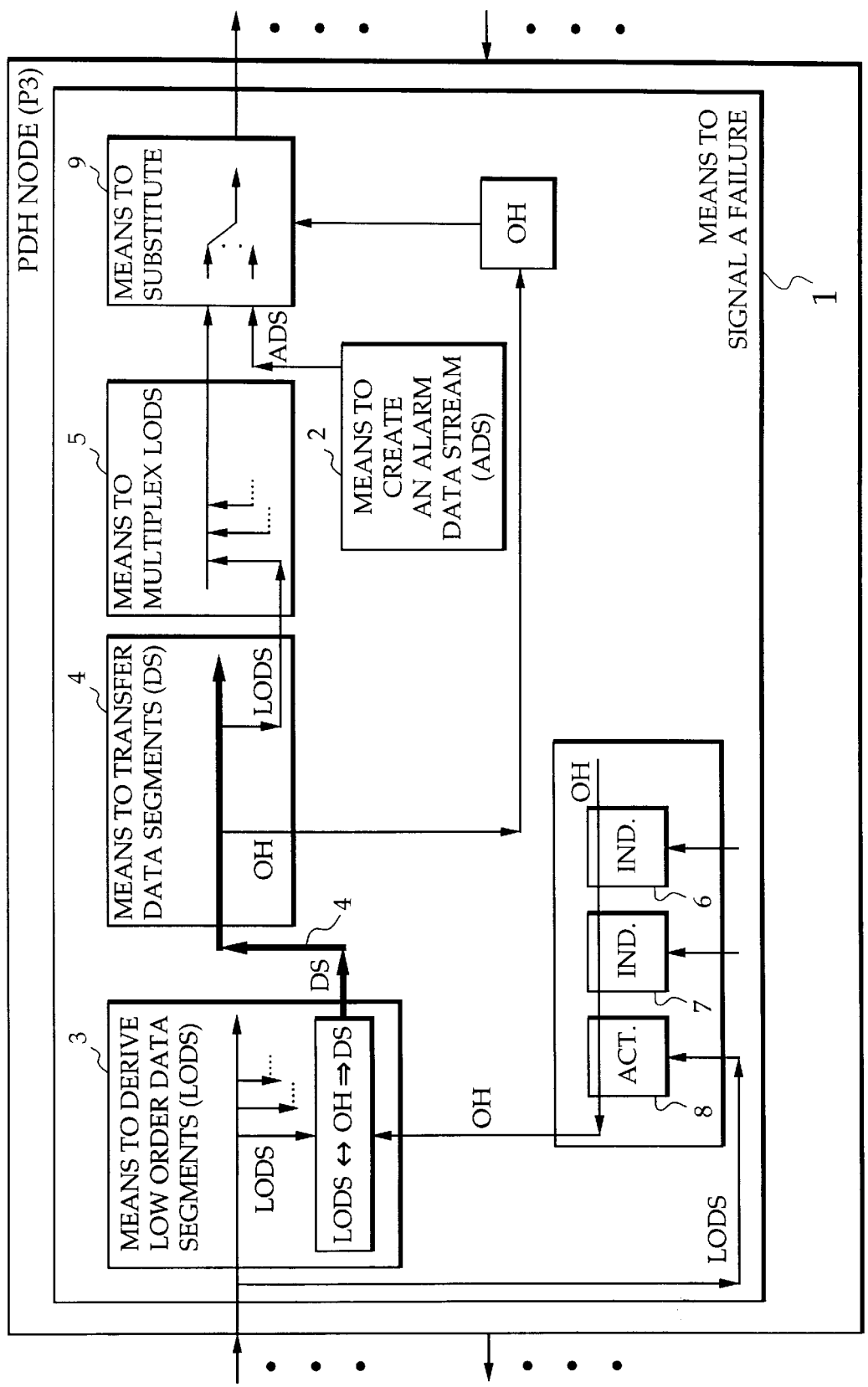
FIG. 3 shows a block diagram of a PDH node for inclusion in a mixed PDH/SDH network.

FIG. 3 shows a typical PDH node P3 of FIG. 1 in detail for inclusion in the mixed PDH/SDH network of FIG. 1. The PDH node P3 is provided with means 1 to signal a failure to an SDH node included in the mixed PDH/SDH network and linked to the PDH node P3 in order to enable the mixed PDH/SDH network to provide a service, such as a protection mechanism. The means to signal a failure includes means 2 to create an alarm data stream (ADS) and to provide the alarm data stream from the PDH node P3 to the SDH node in the event of any of an internal failure of the PDH node, recognition of a first loss of signal condition by the PDH node, or reception of an upstream created alarm data stream by the PDH node.

As shown in FIG. 3, the PDH node P3 includes a plurality of inputs and outputs and is provided with means 3 to derive low order data segments (LODS) from a higher order data stream provided to one of the input means and to associate an overhead segment (OH) to the low order data segments (LODS). Means 4 to transfer data segments (DS) including the low order data segments (LODS) and the overhead segments (OH) from one of the inputs to one of the outputs, and to derive the low order data segments (LODS) from the data segments (DS) are shown in FIG. 3. Also shown are means 5 to multiplex the low order data segments (LODS) into at least one outgoing higher order data stream.

Also shown in FIG. 3 is means 6 to indicate, in the even of an internal failure of the PDH node, the internal failure by activating a part of the overhead segment (OH) associated with at least ones of the low order data segments (LODS), which are influenced by the internal failure. Means 7 to indicate, in the event of recognition of the first loss of signal condition, the first loss of signal condition by activating the part of the overhead segment (OH) associated with at least one of the low order data segments (LODS), which is influenced by the loss of signal condition, is shown. Also shown in means 8 to activate, in the event of reception of the upstream created alarm data stream, the part of the overhead segment (OH) associated with the low order data segments (LODS) which are derived from the upstream created alarm data stream.

Finally, the PDH node P3 is provided with means 9 to substitute each of the outgoing higher order data streams, which includes one of the low order data segments (LODS), whereof the part of the associated overhead segment (OH) is active, with the alarm data stream (ADS).

While the principles of the invention have been described above in connection with specific apparatus, it is to be clearly understood that this description is made only by way of example and not as a limitation on the scope of the invention.

What is claimed is:

1. A PDH node (P1, P2, P3, P4) for inclusion in a mixed PDH/SDH network characterized in that said PDH node (P1, P2, P3, P4) is provided with means to signal a failure to an SDH node included in said mixed PDH/SDH network and linked to said PDH node (P1, P2, P3, P4) in order to enable said mixed PDH/SDH network to provide a service and that said PDH node (P1, P2, P3, P4) is provided with means to create an alarm data stream (ADS) and to provide said alarm data stream from said PDH node (P1, P2, P3, P4) to said SDH node, in the event of any of:

an internal failure of said PDH node; and recognition of a first loss of signal condition by said PDH node (P1, P2, P3, P4); and reception of an upstream created alarm data stream by said PDH node (P1, P2, P3, P4), that said PDH node includes a plurality of inputs and outputs and is provided with means to derive low order data segments (LODS) from a higher order data stream provided to one of said inputs means, to associate an overhead segment (OH) to said low order data segments (LODS) means to transfer data segments (DS) including said low order data segments (LODS) and said overhead segment (OH) from one of said inputs to one of said outputs, to derive said low order data segments (LODS) from said data segments (DS), means to multiplex said low order data segments (LODS) into at least one outgoing higher order data stream and means to indicate in the event of said internal failure of said PDH node (P1, P2, P3, P4) said internal failure by activating a part of said overhead segment (OH) associated to at least one of said low order data segments (LODS) which are influenced by said internal failure;

means to indicate in the event of recognition of said first loss of signal condition said first loss of signal condition by activating said part of said overhead segment (OH) associated to at least one of said low order data segments (LODS) which is influenced by said loss of signal condition;

means to activate in the event of reception of said upstream created alarm data stream said part of said overhead segment (OH) associated to said low order data segments (LODS) which are derived from said upstream created alarm data stream;, and that said PDH node (P1, P2, P3, P4) is provided with means to substitute each said outgoing higher order data streaks, which includes one of said low order data segments (LODS) wherein said part of said associated overhead segment (OH) is active, with said alarm data stream (ADS).

* * * * *

UNITED STATES PATENT AND TRADEMARK OFFICE
CERTIFICATE OF CORRECTION

PATENT NO : 6,055,226
DATED : April 25, 2000
INVENTOR(S): L. Verpooten

It is certified that error appears in the above-identified patent and that said Letters Patent is hereby corrected as shown below:

At col. 8, line 12, claim 1,   please insert a comma after "(LODS)";

at line 37, claim 1,   please cancel "," after ";";

at line 40, claim 1,   please cancel "streaks" and substitute --stream-- therefor; and at line 41, claim 1,   please cancel "wherein" and substitute --whereof-- therefor.

Signed and Sealed this

Thirteenth Day of March, 2001

Attest:

NICHOLAS P. GODICI

Attesting Officer    Acting Director of the United States Patent and Trademark Office